Patented Mar. 25, 1947

2,417,872

UNITED STATES PATENT OFFICE 2,417,872

PROCESS FOR PREPARING A DIMETHYL BUTENE FROM PROPYLENE

Ralph M. Hill and Howard G. Codet, Mountainside, N. J., assignors to Standard Oil Development Company, a corporation of Delaware No Drawing. Application December 19, 1942, Serial No. 469,514

3 Claims. (Cl. 260—683.15)

The present invention relates to a process of converting propylene into useful constituents of motor and aviation fuels by a combined polymerization-isomerization reaction in the presence of a novel catalyst and, if desired, followed by the simple hydrogenation of the product of this reaction to produce the corresponding paraffins therefrom. More particularly, the invention relates to a process of isomerizing and polymerizing propylene to produce 2,2 dimetheyl butene which is then hydrogenated, usually by catalytic means, to produce 2,2 dimethyl butane (neohexane), a most valuable constituent of motor fuels in general and aviation fuels in particular.

Numerous processes have been suggested for the polymerization of propylene to produce the dimer and trimer therefrom, such as n-hexene and n-nonylene, but these processes have singularly failed to produce any appreciable quantities of normally liquid branched chain olefins boiling within the gasoline and aviation ranges so that even upon hydrogenation the final octane blending values of the resultant paraffins have been relatively low and of no great aid in improving the general character of motor fuels for internal combustion engines. Some of these processes have employed aluminum chloride as the polymerization catalyst, and it is also known to employ this aluminum chloride on a carrier such as silica gel, activated carbon and the like. Such processes are disclosed in U. S. Patents Nos. 1,923,583 and 2,204,673.

It is an object of the present invention to produce in a single operation branched chain normally liquid olefinic hydrocarbons from propylene or mixtures containing substantial amounts of propylene but also substantially devoid of any other olefins. It is a further object of the invention to provide increased yields of blending agents for motor fuels suitable for use in internal combustion engines operating on the autocycle, said blending agents being prepared by a simple hydrogenation of the propylene reaction product produced in a combined polymerization-isomerization reaction. It is a further object of the invention to produce substantial quantities of neohexane and other methyl substituted butanes. Other objects of the invention will be apparent upon a fuller understanding of the invention herein described.

It has been discovered that propylene or propane-propylene mixtures can be converted to high octane number hydrocarbons boiling in the gasoline range by subjecting the propylene to the action of a highly active polymerization-isomerization catalyst mass which essentially comprises an active ingredient of aluminum chloride and a carrier, which is also thought to be somewhat active although no definite experimental proof is available as yet concerning it, of alumina. The novel catalyst employed may be prepared as follows:

An alumina, preferably of porous structure, such as bauxite or Activated Alumina, alumina gel or Porocel, is heated or calcined at a temperature between about 850° F. and about 1500° F. for a period ranging from 20 hours at the lower temperature down to 2 hours at the higher temperature, with a preferred calcining operation at about 1100° F. for 2 to 3 hours. This treatment is designed to remove from the alumina carrier all loosely held water since it has been found to be necessary in preparing the catalyst mass to have a catalyst which is substantially anhydrous under the conditions of operation. The alumina carrier so prepared is then maintained at a temperature of between about 50° F. and about 100° F. in excess of the highest temperature to be employed in the reaction while vapors of aluminum chloride which has been freshly sublimed together with a carrier gas such as nitrogen, air, carbon dioxide, hydrogen, methane, ethane, propane or the like are introduced into the porous alumina carrier. The amount of aluminum chloride permitted to be sorbed in the carrier varies depending upon the particular cell structure of the carrier and upon the particular sorption conditions employed. In general, any reasonable amount may be incorporated, but in general the amount desired ranges between about 2% and about 15% by weight of the catalyst mass. The efficacy of the catalyst has been found to be largely dependent upon the care employed in the preparation of the carrier. Unless the carrier is substantially anhydrous under the conditions of operation, the aluminum chloride impregnated therein will hydrolize, giving off hydrogen chloride which in turn unites with the propylene in the reaction and materially decreases the yield of desired products, if not at times inhibiting the desired reaction almost completely. It is not necessary, however, and in fact is not desirable, to completely dehydrate the alumina carriers. It has been found that some very small quantities of moisture, although tenaciously held either in chemical or physical union with the alumina, gives a more highly active type of carrier and more satisfactory from the overall yield standpoint than those which are entirely anhydrous. Nevertheless, the carrier is of sufficient dryness that no free water is released during its use in the combined polymerization-isomerization reaction. In the case of using an alumina gel as the carrier, provision is made for the dehydration of the hydrogel by carefully controlled heat so that the final gel structure contains between 1% and 5% of water. The porosity of such a gel and its sorptive capacity is excellent. After being impregnated with aluminum chloride, it is a very useful catalyst. In general, although varying some with each specific physical type of carrier, the alumina should retain some small quantities of water, preferably between 0.5% and 5% of its weight being water. Larger water tolerances may be utilized with particular cell and pore structure if in fact no free water is given off during the polymerization-isomerization reaction. The alumina carrier, though not being as active as those types previously mentioned, may be completely anhydrous if desired.

Another method of preparing the catalyst is to incorporate particles such as lumps, pellets or granules of aluminum chloride in admixture with the desired amount of calcined alumina carrier and to heat the mass to a temperature somewhat higher than that to be employed in the reaction zone. Depending upon the particular amount of aluminum chloride desired in the carrier, a purging gas may be passed through the mass under these temperature conditions in order to remove from the cell structure of the carrier any loosely held aluminum chloride since it has been found that under the conditions of operation in the reaction it is desirable to minimize the presence of aluminum chloride vapors in the effluent from the reaction zone, hence it is preferred in preparing the catalyst mass to purge the same of any loosely held aluminum chloride.

The reaction conditions employed of course depend to a large extent upon the specific type of feed stock fed to the catalyst mass but in general the temperature is held between about 200° F. and about 700° F., preferably between about 300° F. and about 500° F., with a time of contact ranging between 1 and 200 seconds, preferably 20 to 140 seconds. The reaction may be carried out at atmospheric pressure or pressures as high as 1000 pounds per square inch or even higher may be employed. Preferably, however, moderate pressures of 100 to 500 pounds per square inch are most suitable. The reaction conditions of course will depend not only upon the specific concentration of propylene in the feed stock but also to a large extent upon the specific concentration of aluminum chloride in the carrier mass. As before stated, from 2% to 15% by weight of the catalyst mass constitutes aluminum chloride. Preferably, however, this concentration of aluminum chloride lies between about 5% and about 12%. Within these ranges the reaction conditions must be carefully correlated to give a sufficient length of time for complete reaction to occur while at the same time not allowing the reaction to proceed any longer than required in view of the high temperatures employed which of course are conducive to degradation of the desired products once formed. One specific correlation of the reaction conditions is to be found in a specific example to be hereinafter described.

The feed stock is not restricted to a pure mixture of propylene but may comprise mixtures of propylene with other hydrocarbons, particularly where those hydrocarbons are naphthenic or paraffinic in character. It is desired that the feed stock, so far as its active components are concerned, be largely propylene. A refinery $C_3$ cut from a cracking process which may contain small amounts of $C_2$ and small amounts of $C_4$ but which largely contains propane and propylene is a desirable feed stock for the present process. The composition of the feed may range from 10% to 90% propylene, with the balance being propane.

No special type of apparatus is required in carrying out the reaction. It is sufficient that the equipment customarily employed in vapor phase catalytic reactions be used. The feed may be introduced into the reactor and catalyst zone either upflow or downflow and a bed of alumina carrier which has not been previously impregnated with aluminum chloride may serve as a filter for the reacted effluent to remove any traces of aluminum chloride vapors which may be entrained or carried over with the reacted effluent. This filter medium may then in turn be impregnated with aluminum chloride in the desired quantity and employed as the catalyst composition.

The products of the reaction are not clear-cut and sharply defined as yet. It is known, however, that 2,2 dimethyl butene and 2,3 dimethyl butene are among the principal products of the reaction. As is known, the branched chain olefins are of much greater utility as blending agents and constituents of internal combustion engine motor fuels if they are saturated in character by the addition of hydrogen to their molecules. This process is a conventional one but in order to make the present description complete a brief reference will be made thereto. In the hydrogenation of the isopolymers of the reaction of propylene, an autoclave or suitable high pressure vessel is employed, using a temperature of 250° F. to 500° F. and a pressure of from 5 to 100 atmospheres. Any suitable difficultly reducible metal oxide or any of the known hydrogenation catalysts such as metallic nickel, vanadium and the like may be employed and a vapor phase reaction of the olefin with the hydrogen is effected in about 1 to 2 hours. A suitable nickel catalyst for the reaction is prepared by slowly heating technical nickelous formate suspended in an oil to about 500° F. and holding the temperature to this point for 3 hours, an atmosphere of hydrogen being maintained thereon at all times. The mixture is then cooled and the nickel settled by centrifuging. Raney nickel may also be employed as the hydrogenation catalyst.

The following example is intended to be illustrative of the invention herein described but it is not intended that the example be limiting as to the invention herein described.

*Example*

Porocel of relatively low iron content was heated for a period of 2 hours at a temperature of about 1100° F. to drive all but about 2% of water off. This calcined carrier was then impregnated with about 5.5% of aluminum chloride by subliming aluminum chloride and introducing the vapors into the carrier by means of nitrogen as a carrier gas. The catalyst was then charged to a tubular (200 cc. capacity) catalyst zone which was in a continuous system. The catalyst was maintained at a temperature of about 350° F. and under a pressure of about 350 pounds per square inch. A mixture of 55% propylene and 45% propane was passed at the rate of between about 1 and about 1.5 liquid volumes of propylene per volume of catalyst per hour through and in contact with the catalyst mass over an eight hour period. A liquid product amounting to about 32% of the propylene was collected. An analysis on a propylene-free basis showed that the liquid product contained about 48% of $C_6$ hydrocarbons. This $C_6$ fraction was hydrogenated and an analysis indicated that about 20% of the hydrogenated product was neohexane (2,2 dimethyl butane), which corresponded to about 15% of the liquid product produced during the polymerization-isomerization reaction with the propylene.

Having thus fully described and illustrated the character of the invention, what is desired to be secured by Letters Patent is:

1. A process for the production of dimethyl substituted $C_4$ hydrocarbons from propylene which comprises subjecting a gas feed consisting essentially of $C_3$ hydrocarbons including at least predominating amounts of propylene in a combined isomerization-polymerization reaction to the catalytic action of a catalyst containing between about 2 and 12 weight per cent of aluminum chloride sorbed on an alumina partially dehydrated by calcining to a water content of less than about 4%, at a reaction temperature of about 350° F. and a throughput of between about 1 and 1.5 liquid volumes of propylene per volume of catalyst per hour while maintaining a pressure of about 350 lbs. per sq. in. gauge.

2. A process for the production of 2,2-dimethyl butene which comprises subjecting a gas feed consisting essentially of $C_3$ hydrocarbons including at least predominating amounts of propylene at a temperature of about 350° F., a pressure of about 350 lbs. per sq. in. gauge, and a throughput of between about 1 and 1.5 liquid volumes of propylene per volume of catalyst per hour to a combined polymerization-isomerization reaction while in contact with a catalyst comprising essentially between about 2 and 12 weight per cent of aluminum chloride sorbed on an alumina partially dehydrated by calcining to a water content of less than about 4%.

3. A process for the production of 2,2-dimethyl butene which comprises subjecting a gas feed consisting essentially of $C_3$ hydrocarbons including at least predominating amounts of propylene at a temperature of about 350° F., a pressure of about 350 lbs. per sq. in. gauge, and a throughput of between about 1 and 1.5 liquid volumes of propylene per volume of catalyst per hour to a combined polymerization-isomerization reaction while in contact with a catalyst mass comprising essentially between about 2 and about 12 weight per cent of aluminum chloride sorbed on a bauxite partially dehydrated by previous calcination at a temperature above 700° F. for a sufficient length of time to insure no further evolution of water during the use of the carrier in the isomerization-polymerization reaction.

RALPH M. HILL.
HOWARD G. CODET.

REFERENCES CITED

The following references are of record in the file of this patent:

UNITED STATES PATENTS

| Number | Name | Date |
| --- | --- | --- |
| 2,313,053 | De Simo | Mar. 9, 1943 |
| 2,204,673 | Fulton et al. | Mar. 18, 1940 |
| 1,923,583 | Pungs et al. | Aug. 22, 1933 |
| 2,309,263 | Thomas | Jan. 26, 1943 |
| 2,311,713 | Thomas et al. | Feb. 23, 1943 |
| 2,313,054 | De Simo et al. | Mar. 9, 1943 |
| 2,327,593 | De Simo | Aug. 24, 1943 |
| 2,281,924 | De Simo et al. | May 5, 1942 |

FOREIGN PATENTS

| Number | Country | Date |
| --- | --- | --- |
| 510,478 | British | Aug. 2, 1939 |